United States Patent [19]
Bando

[11] Patent Number: 5,790,485
[45] Date of Patent: Aug. 4, 1998

[54] AUTOMATIC DISK CHANGER WITH LID ARRANGED TO PREVENT UNINTENTIONAL DROPPING OF DISKS FROM A DISK ARRANGING STAND

[75] Inventor: Takayoshi Bando, Daito, Japan

[73] Assignee: Funai Electric Co., Ltd., Osaka, Japan

[21] Appl. No.: 714,611

[22] Filed: Sep. 16, 1996

[30] Foreign Application Priority Data

Sep. 20, 1995 [JP] Japan .................. 7-241605

[51] Int. Cl.⁶ .......................... G11B 17/22; G11B 33/12
[52] U.S. Cl. .......................... 369/36; 369/178; 369/192; 369/75.1
[58] Field of Search .............. 369/36, 39, 178, 369/191, 192, 75.1; 360/98.04, 98.05, 98.06, 99.06, 92; 312/9.14, 9.15, 9.32, 9.55; 206/308.1; 220/200

[56] References Cited

U.S. PATENT DOCUMENTS

| | | | |
|---|---|---|---|
| 2,946,594 | 7/1960 | Staar | 369/192 |
| 4,538,253 | 8/1985 | Ishibashi et al. | 369/36 |
| 4,567,584 | 1/1986 | Kawakami | 369/36 |
| 4,599,716 | 7/1986 | Shimbo | 369/36 |
| 5,232,275 | 8/1993 | Yamazoe | 369/36 |
| 5,338,108 | 8/1994 | Hunt et al. | 312/9.14 |
| 5,449,229 | 9/1995 | Aschenbrenner et al. | 360/92 |
| 5,611,607 | 3/1997 | Kuzara et al. | 312/9.14 |

FOREIGN PATENT DOCUMENTS 61-156563  7/1986  Japan.

*Primary Examiner*—Craig A. Renner
*Attorney, Agent, or Firm*—Bacon & Thomas, PLLC

[57] ABSTRACT

An automatic disk changer, includes a housing having an opening in its front wall, and accommodates a disk arranging stand on which a number of disks put in the housing through the opening are arranged at predetermined intervals, and a carriage which is movable forwardly and backwardly along the disk arranging stand. The carriage has a loading mechanism which is adapted to take a desired disk out of the group of disks on the disk arranging stand and place it on the carriage, and a disk mounting mechanism which is adapted to mount on a player body the disk thus placed on the carriage. In the automatic disk changer, the housing has a lid, which is adapted to open and close the opening, in such a manner that the lid, when opened, is positioned behind the disks arranged on the disk arranging stand.

5 Claims, 17 Drawing Sheets

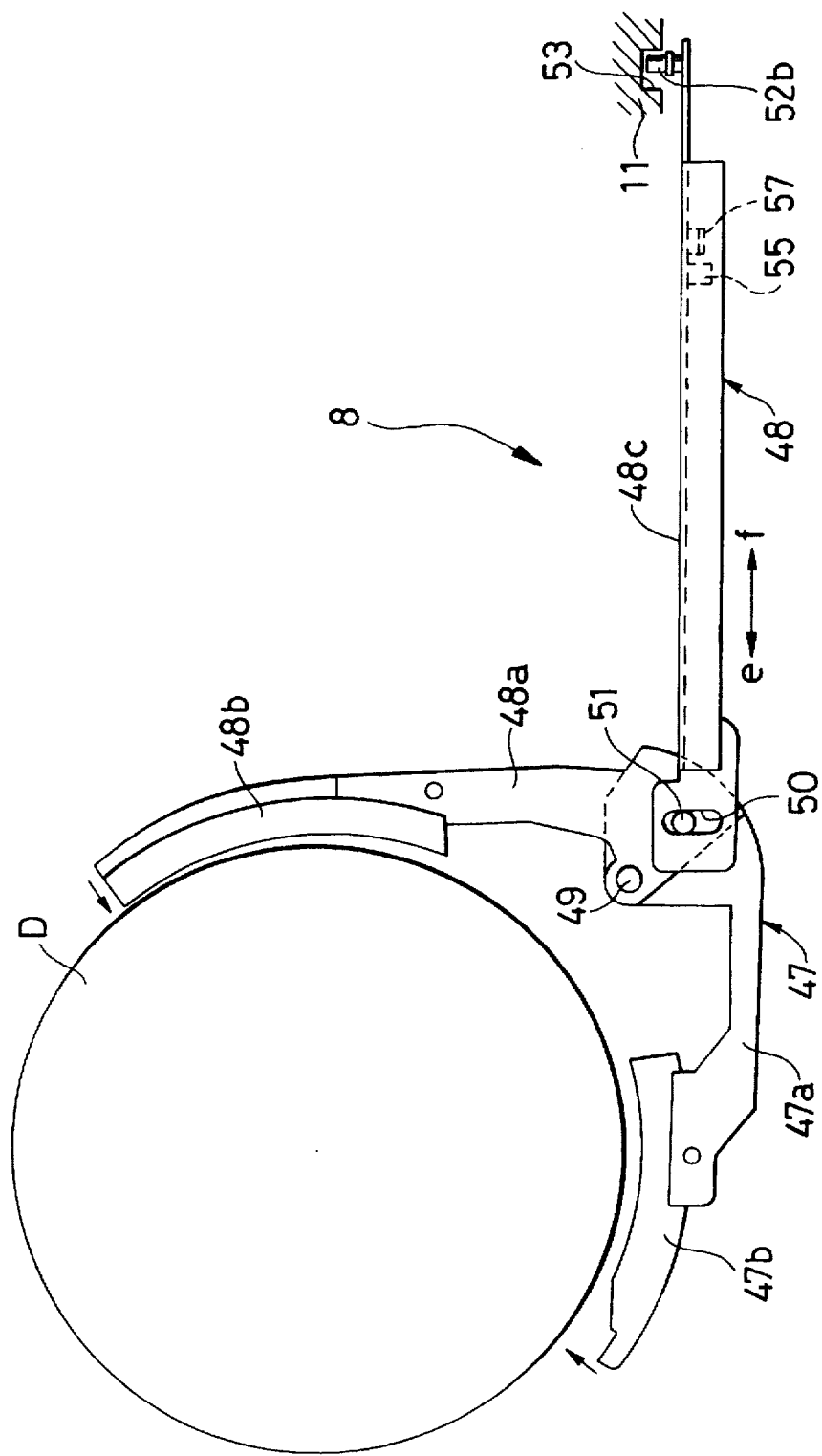

FIG.12

AUTOMATIC DISK CHANGER WITH LID ARRANGED TO PREVENT UNINTENTIONAL DROPPING OF DISKS FROM A DISK ARRANGING STAND

BACKGROUND OF THIEF INVENTION

1. Field of the Invention

This invention relates to an automatic disk changer which operates to take a desired one out of a group of optical disks or magneto-optical disks such as so-called compact disks (CDs) and mini-disks (MDs) (hereinafter referred to merely as "disks", when applicable), and reproduce, record and/or erase with respect to the disk.

2. Description of the Related Art

An example of an automatic disk changer of this type has been disclosed in Japanese Patent Unexamined Publication No. Sho. 61-156563. The automatic disk changer comprises a disk arranging stand and carriage which are arranged in a housing. On the disk arranging stand, a plurality of disks are arranged at predetermined intervals. The carriage is movable forwardly and backwardly along the disk arranging stand. The carriage has: a disk lifting mechanism for slightly lifting a desired disk from the disk arranging stand; a loading mechanism for loading on the carriage the disk thus lifted; a disk mounting mechanism for mounting the disk on the player body provided on the carriage; and a mechanism for preventing a disk from dropping from the disk arranging stand (hereinafter referred to as "a disk drop preventing mechanism", when applicable).

The disk drop preventing mechanism has a disk stop wire with a coil spring which is laid between the carriage and pulleys provided on both side walls of the housing, to prevent a disk from unintentionally dropping from the disk arranging stand.

The above-described automatic disk changer is disadvantageous in that the disk drop preventing mechanism is complex in structure, large in the number of components, and accordingly high in manufacturing cost.

SUMMARY OF THE INVENTION

In view of the foregoing, an object of the invention is to provide an automatic disk changer which is simple in structure and low in manufacturing cost.

In order to achieve the above object, the invention provides an automatic disk changer comprising: a housing having an opening in a front wall thereof though which a disk is put in or taken out of the housing; a disk arranging stand on which a number of disks put in the housing through the opening are arranged at predetermined intervals; a carriage which is movable forwardly and backwardly along the disk arranging stand; a loading mechanism, provided on the carriage, for taking a desired disk out of the disks arranged on the disk arranging stand and placing the disk on the carriage; a disk mounting mechanism, provided on the carriage, for mounting on a player body the disk thus placed on the carriage; and a lid for opening and closing the opening of the housing in such a manner that the lid, when opened, is positioned behind the disks arranged on the disk arranging stand.

BRIEF DESCRIPTION OF THE DRAWINGS

FIG. 9 is a side view showing a loading mechanism before it loads a disk in the automatic disk changer.

FIG. 12 is a plan view of the loading mechanism shown in FIG. 11.

DETAILED DESCRIPTION OF THE PREFERRED EMBODIMENT

Figure 21:
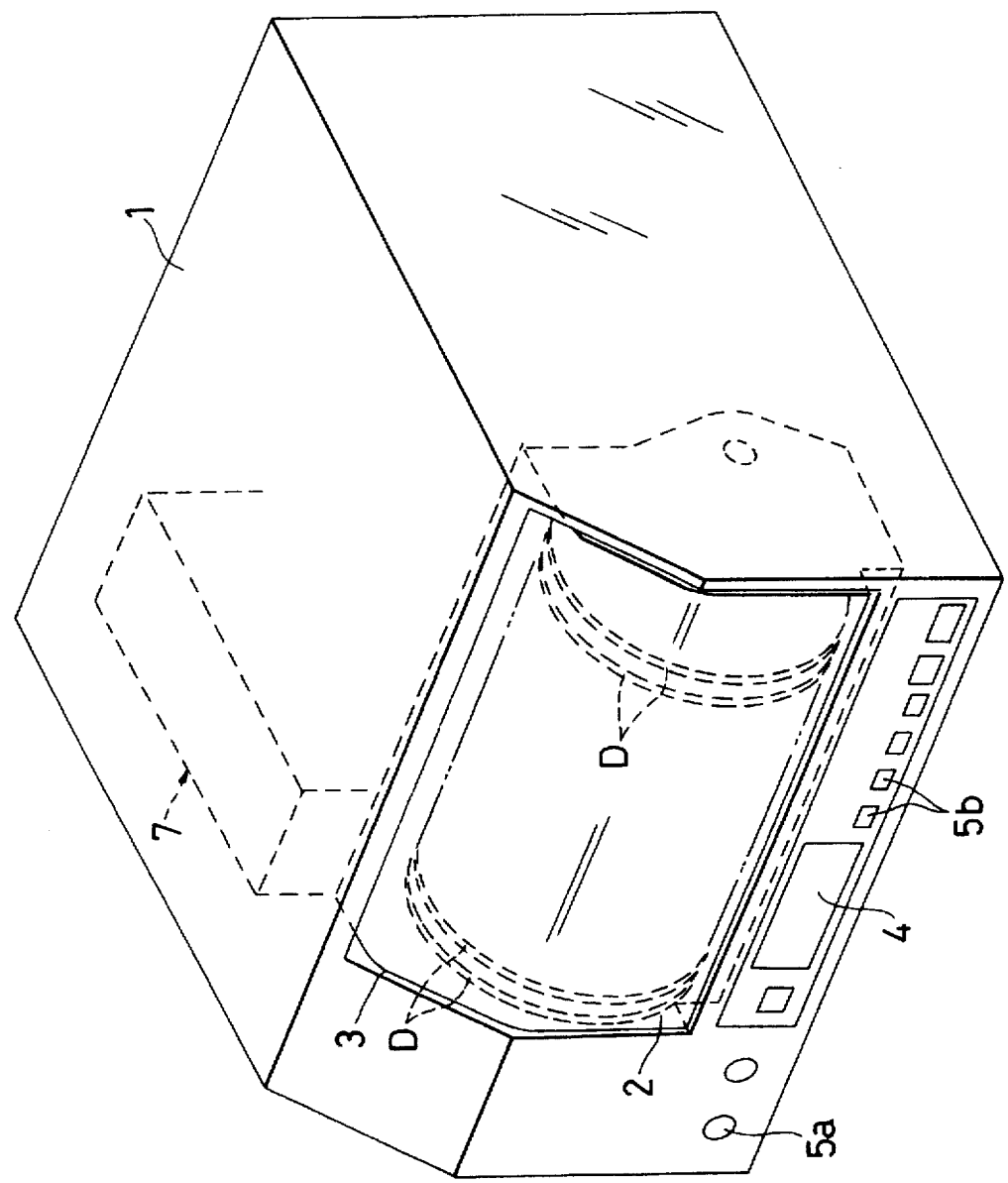
FIG. 21 is a perspective view of the automatic disk changer.

An automatic disk changer, which constitutes a preferred embodiment of the invention, will be described with reference to the accompanying drawings. FIG. 21 shows the automatic disk changer according to the embodiment. As shown in FIG. 21, a housing 1 has an opening 3 in the upper portion of its front wall through which a disk D is put in the housing or taken out of the housing, and the opening 3 has a lid 2 which is swung to open and close the opening 3. Furthermore, the housing 1 has a display section 4 and various operating switches such as a power switch 5*a* and disk specifying switches 5*b* on the lower portion of the front wall.

Figure 1:
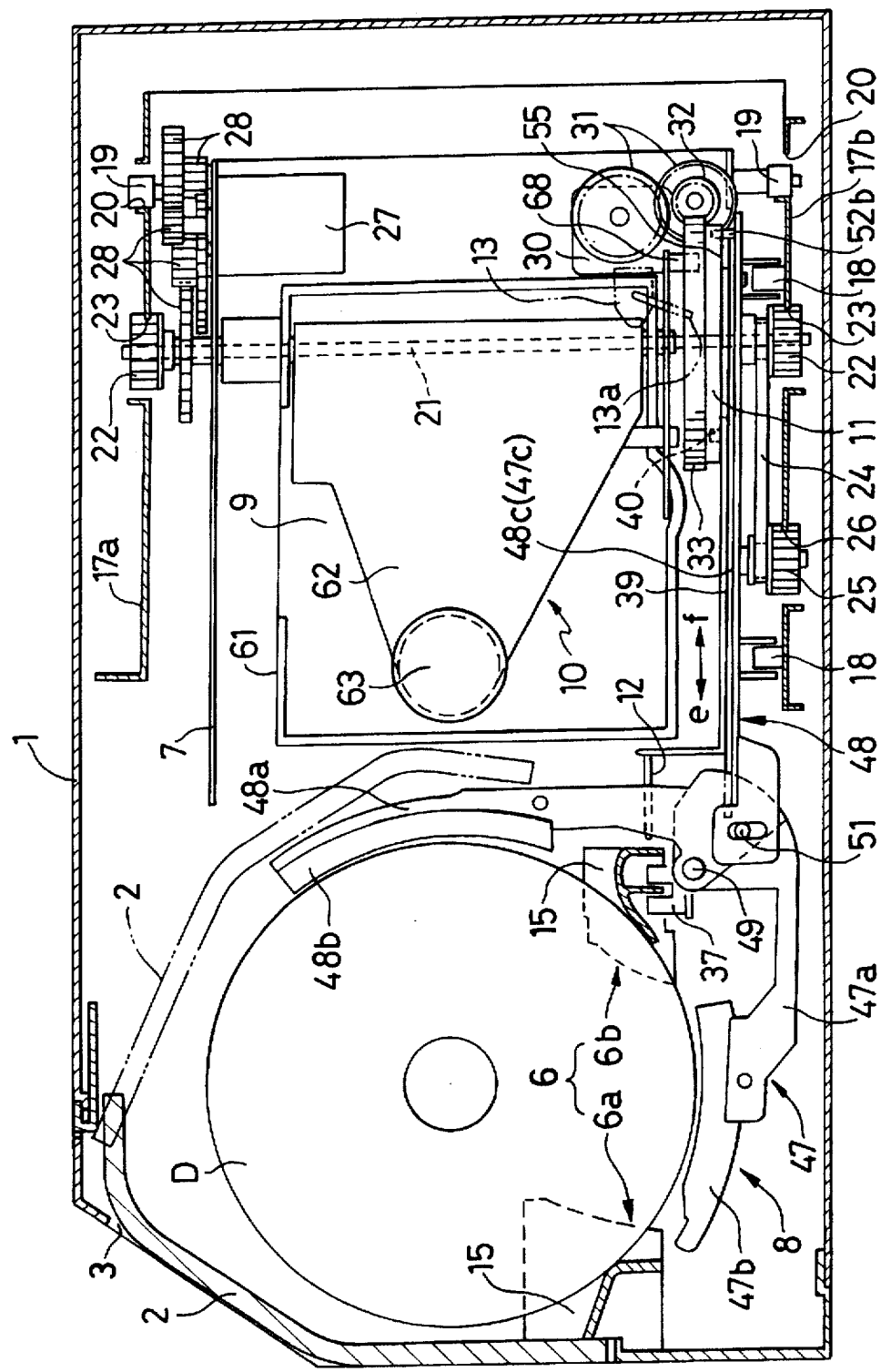
FIG. 1 is a vertical sectional view showing an automatic disk changer, which constitutes a preferred embodiment of the invention.
Figure 2:
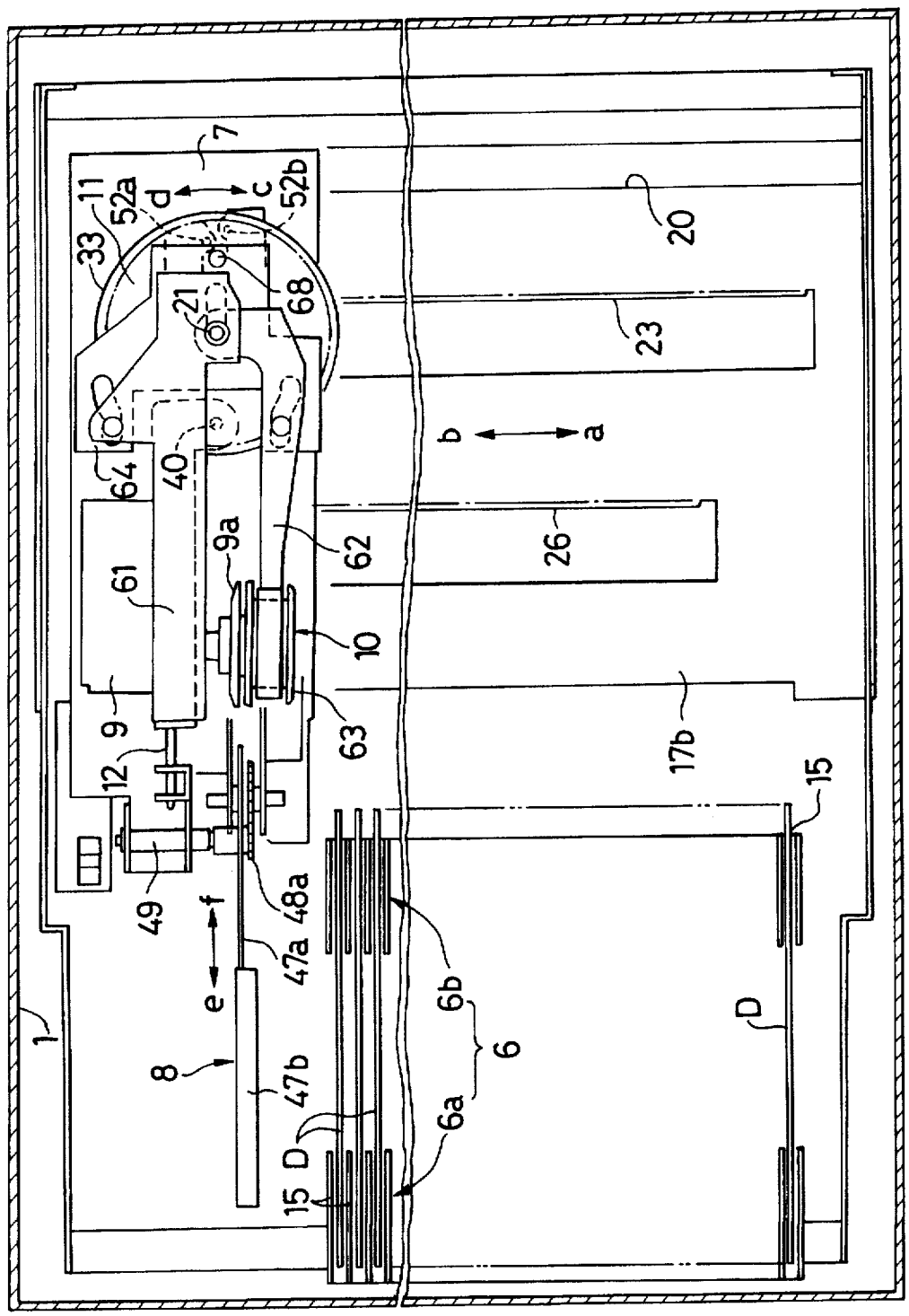
FIG. 2 is a horizontal sectional view of the automatic disk changer shown in FIG. 1.

As shown in FIGS. 1 and 2, a disk arranging stand 6 on which a number of disks D are arranged at predetermined intervals, and a carriage 7 which is movable in the directions of the arrows a and b along the disk arranging stand 6 are provided in the housing 1. The carriage 7 has a loading mechanism 8 which takes a desired one of the disks D on the disk arranging stand 6 and places it on the carriage 7, and a disk mounting mechanism 10 which mounts the disk D on a player body 9 provided on the carriage 7. A cam 11 for driving the aforementioned two mechanisms 8 and 10 is rotatably mounted on the carriage 7. In addition, a locking pin 12 is provided in the housing 1. The locking pin 12 is driven by the cam 11 so that it detachably engages with the disk arranging stand 6 (or a predetermined member to be engaged therewith), whereby the carriage 7 is locked at a predetermined position. Moreover, a cam stop switch 13 is provided between the carriage 7 and the cam 11, to detect when the cam 11 turns through a predetermined angle of rotation in the forward direction or in the reverse direction, thus reaching a predetermined stop position.

The disk arranging stand 6, as shown in FIGS. 1 and 2, comprises a front line section 6a and a rear line section 6b which are arranged in parallel with each other and are spaced a predetermined distance from each other. Chose sections 6a and 6b have a number of grooves 15 which are arranged at predetermined intervals in the directions of the arrows a and b. The disks D are inserted in the grooves 15 thus arranged.

Figure 3:
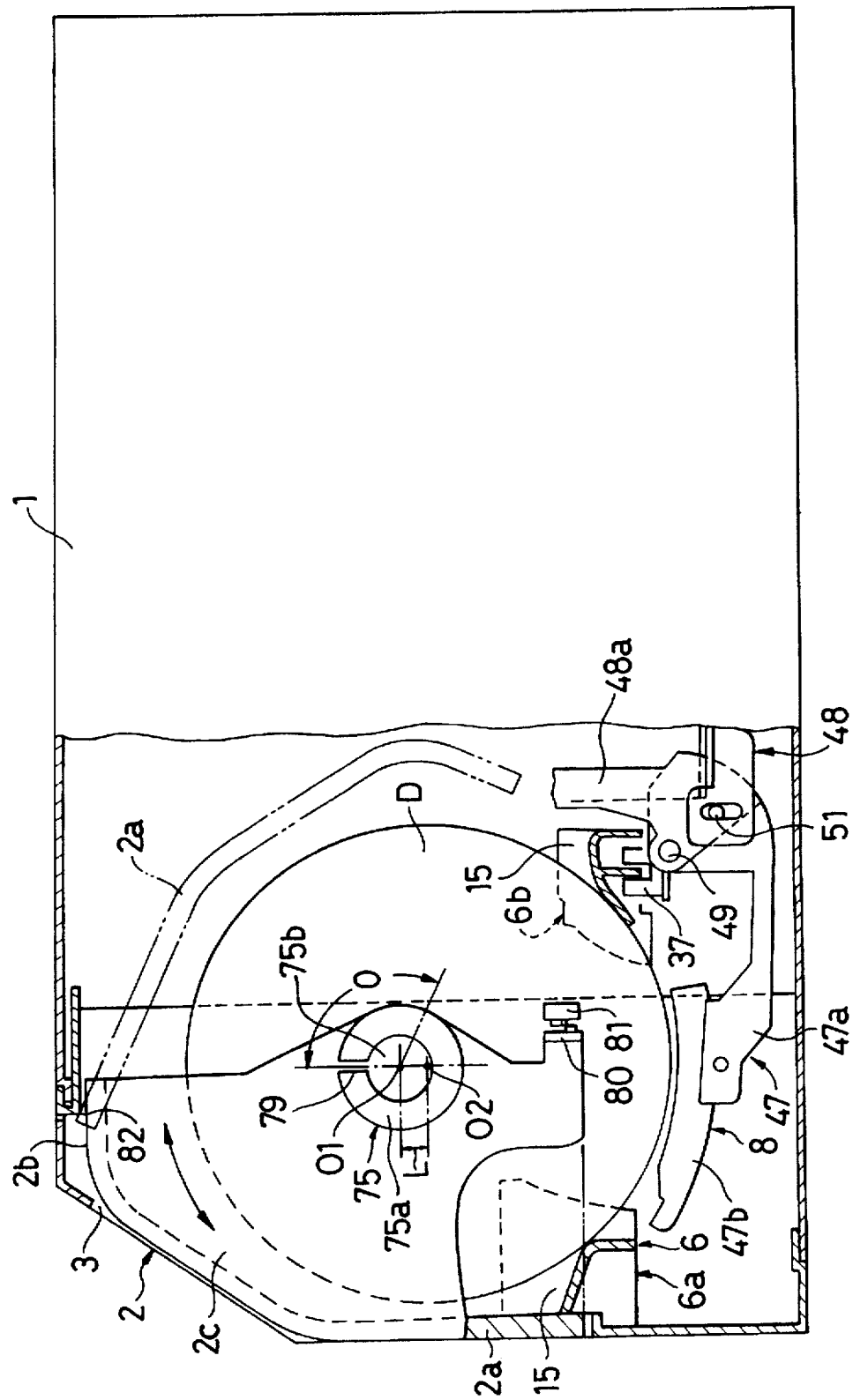
FIG. 3 is a side view, with parts cut away, showing the automatic disk changer.
Figure 4:
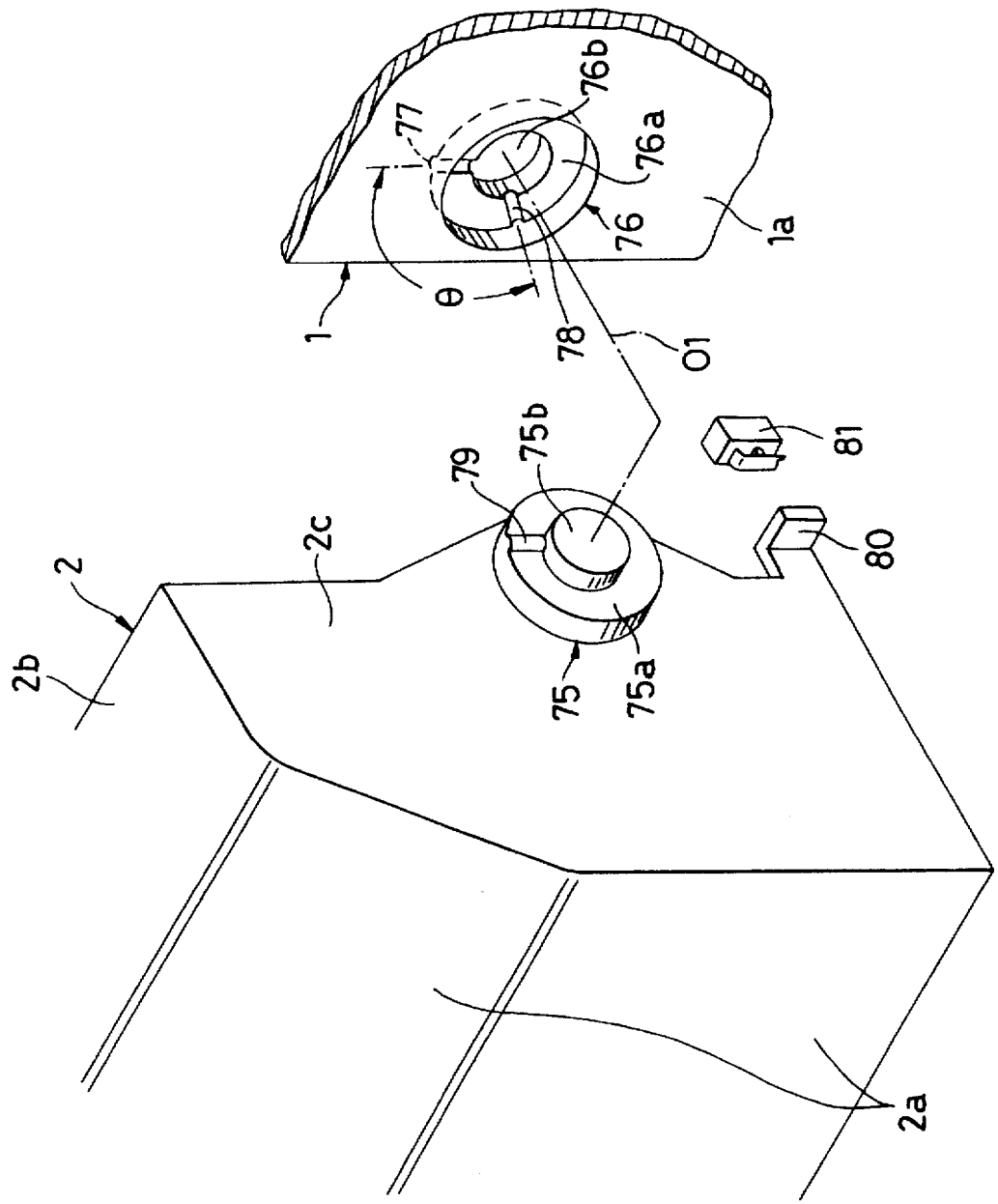
FIG. 4 is an exploded perspective view, mainly showing a lid which is provided for the housing of the automatic disk changer.

The lid 2, as shown in FIGS. 3 and 4, includes a front plate 2a substantially L-shaped in section, a top plate 2b extending from the upper edge of the front plate 2a, and right and left side plates 2c which extend from the right and left edges of the front plate 2a and the top plate 2b, respectively. On each of the outer surfaces of the side plates 2c, a pivotally supporting protrusion 75 is formed consisting of a large diameter protrusion 75a and a small diameter protrusion 75b formed on the protrusion 75a in such a manner that the large diameter protrusion 75a is coaxial with the small diameter protrusion 75b. On the other hand, in correspondence to the pivotally supporting protrusions 75 of the lid 2, two pivotally supporting recesses 76 are formed in the inner surfaces of the side plates 1a of the housing 1 which are confronted with the side plates 2c of the lid 2. More specifically, each of the pivotally supporting recesses 76 consists of a large diameter recess 76a and a small diameter recess 76b which is formed in the large diameter recess 76a in such a manner that the large diameter recess 76a is coaxial with the small diameter recess 76b. The pivotally supporting protrusions 75 are engaged with the pivotally supporting recesses 76, respectively, so that the lid 2 is swingable about the axis O1 of the pivotally supporting protrusions 75 and the pivotally supporting recesses 76.

A pair of engaging grooves 77 and 78 are formed in each of the large diameter recesses 76a in such a manner that they form a predetermined angle θ (115° in the embodiment). In correspondence to the engaging grooves 77 and 78, an engaging protrusion 79 is formed on each of the large-diameter protrusions 75a. When the lid 2 is closed, the engaging protrusions 79 are engaged with the engaging grooves 77; and when the lid 2 is opened, the engaging protrusions 79 are engaged with the engaging grooves 78. Thus, the lid 2 can be held closed (as indicated by the solid lines in FIG. 3), or held opened (as indicated by the phantom lines in FIG. 3). When the lid 2 is opened, the lower end portion of the front plate 2a is abutted against a stopper 82 which extends from the lower surface of the top wall of the housing 1, thus preventing the further movement of the lid 2 into the housing 1.

One of the side plates 2c has a protruding piece 80 which extends from the lower end portion thereof in such a manner that it is confronted with a closure detecting unit 81 which is made up of a limit switch or the like. Hence, when the lid 2 is closed, the protruding piece 80 is abutted against the detecting section of the closure detecting unit 81, thereby to determine that the lid 2 has been completely closed.

With the automatic disk changer thus designed, when the lid 2 is opened, it is positioned behind the number of disks D arranged on the disk arranging stand 6 as shown by the phantom line in FIG. 3, thereby to prevent the disks D from dropping from the disk arranging stand 6. That is, the lid 2 serves as a mechanism for preventing a disk from dropping from the disk arranging stand 6 (hereinafter referred to as "a disk drop preventing mechanism", when applicable). Hence, the automatic disk changer is simple in structure and low in manufacturing cost when compared with the conventional one.

As shown in FIG. 3, the axis of rotation O1 of the lid 2 is shifted upwardly as much as a predetermined distance L from the axis O2 of the disks D arranged on the disk arranging stand 6. Hence, in this case, compared with the case where the axis of rotation O1 is made equal in level to the axis O2, the radius of rotation of the lid 2 is small, and the lid 2 can be set close to the disks D as well. That is, in order to put a disk D into or take it out of the housing 1 with the lid 2 opened, there must be some clearance between the upper end of the disk D and the front edge of the front plate 2a of the lid 2. On the other hand, it is desirable that the top plate 2b of the lid 2 and the portion of lid 2 which is adjacent to the top plate 2b are positioned as close to the rear end of the disk D as possible. In the embodiment, as was described above, the axis of rotation O1 of the lid 2 is shifted upwardly from the axis O2 of the disks D. This feature results in the advantage that, while the aforementioned clearance is obtained, the top plate 2b of the lid 2 and the portion of lid 2 which is adjacent to the top plate 2b can be positioned close to the rear ends of the disks D, thus preventing the disks D from dropping backwardly.

As shown in FIGS. 1 and 2, the carriage 7 is provided between an upper base board 17a and a lower base board 17b which are secured to the housing 1, and is mounted through wheels 18 on the lower base board 17b. Furthermore, the carriage 7 has lateral vibration preventing rolls 19 which are extended from the upper and lower portions of the carriage 7, respectively, in such a manner that they are rollingly in abutment with the sides of elongated holes 20 formed in the upper and lower bas(s boards 17a and 17b, respectively. A supporting shaft 21 penetrates the carriage 7 vertically, and has a pair of pinions 22 fixedly mounted on its both end portions in such a manner that the pinions 22 are engaged with a pair of racks 23 of the upper and lower base boards 17a and 17b. The lower pinion 22 is coupled through an endless belt 24 to a pinion 25 which is engaged with a rack 26 of the lower base board 17b. Hence, when a carriage motor 27 mounted on the upper portion of the carriage 7 is driven, the pinions 22 and 25 are turned in the forward direction or in the backward direction, whereby the carriage 7 can be moved in the directions of the arrows a and b.

As shown in FIGS. 1 and 2, the cam 11 is mounted on the shaft 21 on the carriage 7 in such a manner that it is rotatable in the forward and reverse directions of the arrows c and d. Hence, as a cam motor 30 mounted on the lower portion of the carriage 7 is driven, the cam 11 is turned in the forward direction or in the reverse direction through a gear mechanism 31, a worm 32, and a gear 33 formed in the outer periphery of the cam 11.

Figure 5:
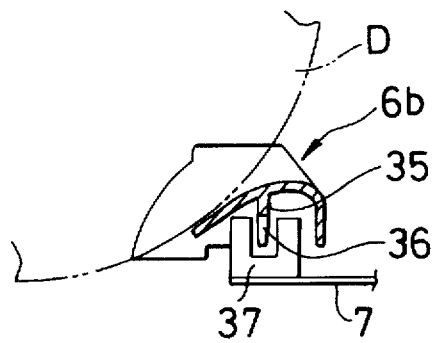
FIG. 5 is a cross sectional view of a rear line section of a disk arranging stand in the automatic disk changer.
Figure 6:
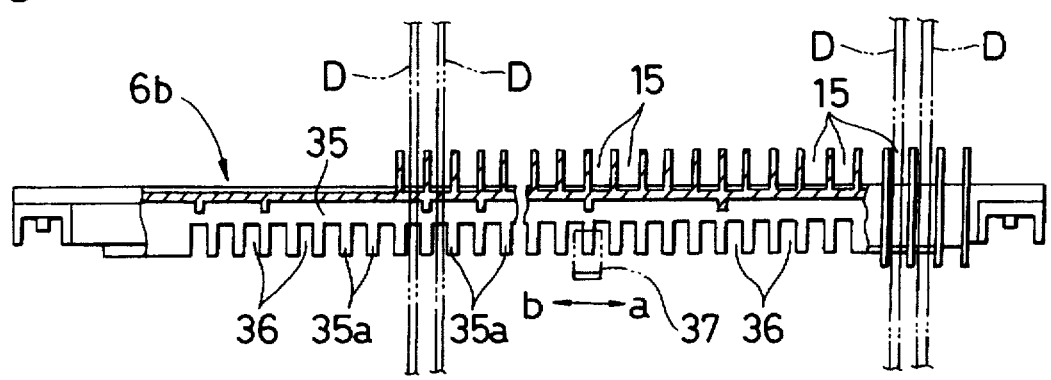
FIG. 6 is a vertical sectional view of the rear line section shown in FIG. 5.

As shown in FIGS. 5 and 6, an intermediate plate 35 extends downwardly from the middle of the lower surface of the aforementioned rear line section 6b, and a number of slits 36 are formed in the intermediate plate 35 at: predetermined intervals in the directions of the arrows a and b. In addition, a photo-detector 37 comprising a light emitting unit and a light receiving unit is provided on the carriage 7 with the intermediate plate 35 between those units. On the other hand, when the slits 36 are formed in the intermediate plate 35, protruded pieces 35a are accordingly formed between them. Hence, as the carriage 7 is moved in the directions of the arrows a and b, the light beam emitted from the light emitting unit towards the light receiving unit is intercepted by the protruded pieces 35a of the intermediate plate 35. Hence, by counting the pulse signal which the photo-detector 37 outputs whenever the light beam is intercepted in the above-described manner, the position of the carriage 7 can be detected.

Figure 7:
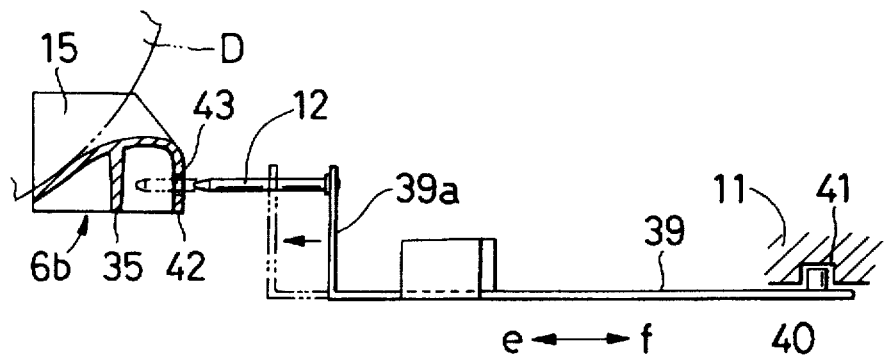
FIG. 7 is a cross sectional view showing a locking pin and its relevant components in the automatic disk changer.
Figure 8:
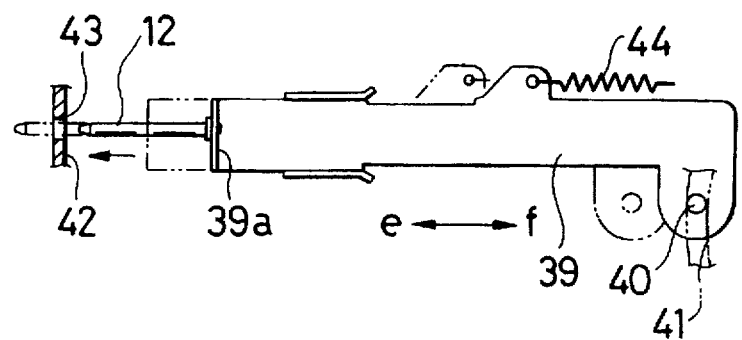
FIG. 8 is a plan view of the components shown in FIG. 7.

As shown in FIGS. 7 and 8, a substantially L-shaped movable plate 39 is provided on the carriage 7 in such a manner that it is movable in the directions of the arrows e and f, and the aforementioned locking pin 12 is protruded from the raised portion 39a of the movable plate 39 in such a manner that it is extended in the directions of the arrows of e and f. Furthermore, the movable plate 39 has a cam pin 40 on the upper surface of its rear end portion. The cam pin 40 is engaged with a locking-pin cam groove 41 formed in the lower surface of the cam 11. Furthermore as shown in FIGS. 7 and 8, a number of locking holes 43 (which are to be selectively engaged with the locking pin) are formed in the rear plate 42 of the rear line section 6b in the directions of the arrows a and b at the same intervals as the grooves 15. The movable plate 39 is urged backwardly by a tension spring 44.

Figure 18A:
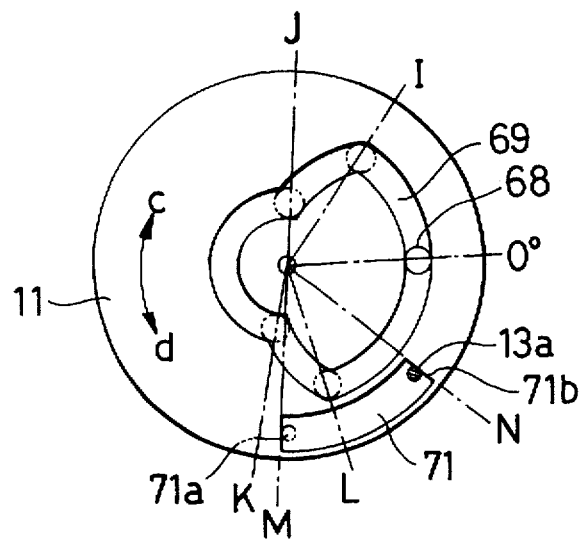
FIGS. 18 (*a*), 18 (*b*) and 183 (*c*) are plan views outlining a cam in the automatic disk changer.
Figure 18B:
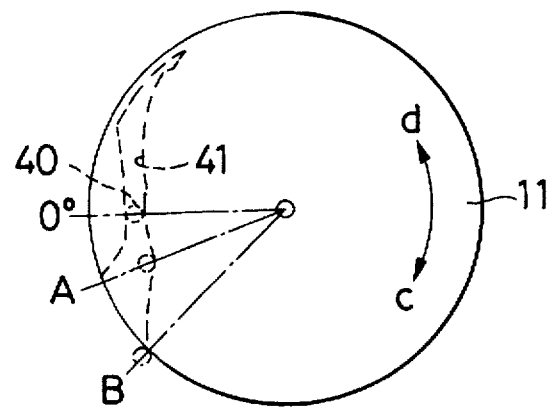
Figure 18C:
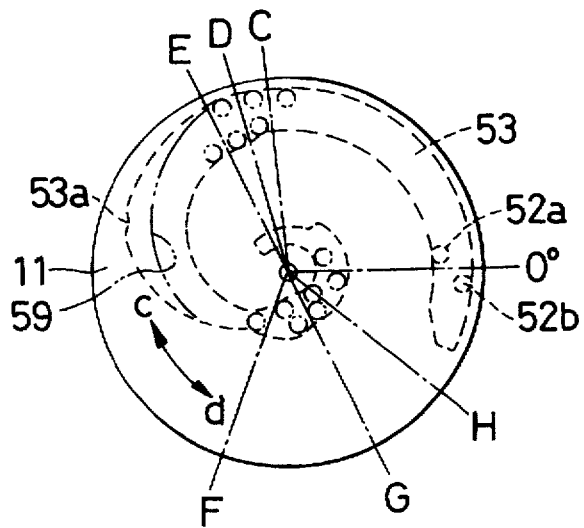

When, in the automatic disk changer thus constructed, the carriage 7 is stopped at a specified disk D, and the cam 11 is turned in the forward direction of the arrow c, then as shown in FIGS. 18 (b) and 19, the cam pin 40 is moved forwardly (in the direction of the arrow e) beginning when the cam 11 reaches the position A (21') from the zero position (0°), and when the cam 11 comes to the position B (45°), the forward movement (in the direction of the arrow e) of the cam pin 40 is suspended so that the locking pin 12 is inserted into the locking hole 43 (as indicated by the phantom lines in FIGS. 7 and 8), whereby the carriage 7 is locked at the desired position. When the cam 11 is turned in the reverse direction (in the direction of the arrow d), as opposed to the above-described operation the cam pin 40 is retracted (in the direction of the, arrow f), whereby the locking pin 12 is disengaged from the locking hole 43 (as indicated by the solid lines in FIGS. 7 and 8). Hence, the carriage 7 can be moved in the directions of the arrows a and b.

Figure 10:
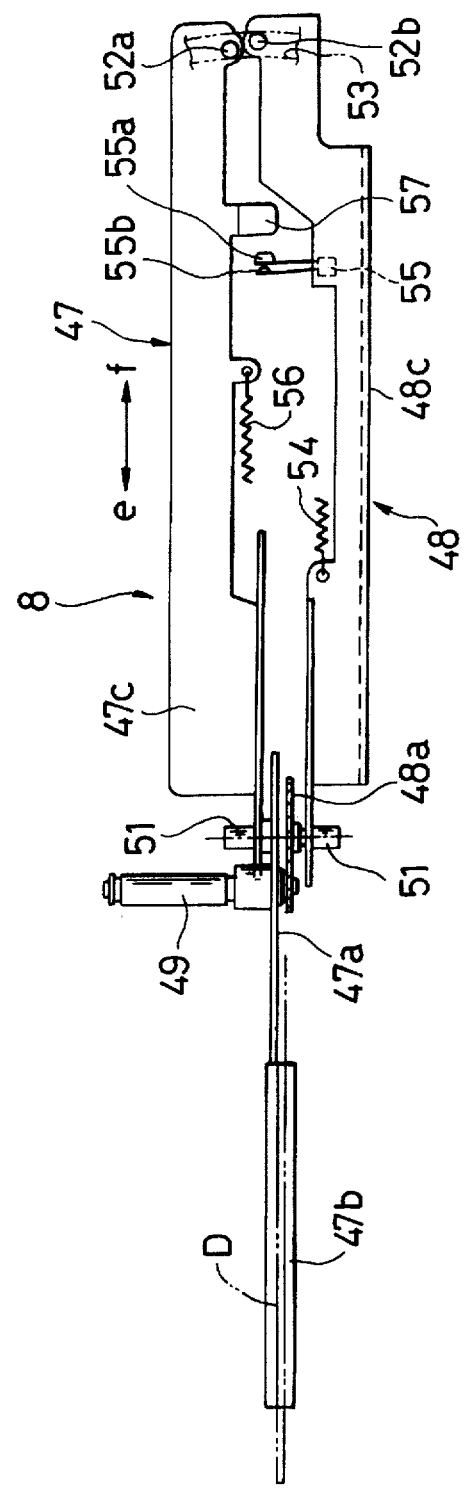
FIG. 10 is a plan view of the loading mechanism shown in FIG. 9.

The aforementioned loading mechanism 8, as shown in FIGS. 9 and 10, comprises: a lower loading section 47 which is confronted with the lower edge of a disk D; and a side loading section 48 which is confronted with one side edge of the disk D. The loading sections 47 and 48 comprise: a pair of disk clamping arms 47a and 48a, disk clamping pieces 47b and 48b, and coupling bars 47c and 48c, respectively. The disk clamping arms 47a and 48a are arranged to form a mutual angle of about 90° with each other, and have their base end portions mounted on the carriage 7 through a pivotally supporting shaft 49 in such a manner that the disk clamping arms 47a and 48a are swingable about the shaft 49. The, disk clamping pieces 47b and 48b are arcuate, and are swingable coupled to the end portions of the arms 47a and 48a, respectively. The coupling bars 47c and 48c are supported on the carriage 7 in such a manner that they are movable in the directions of the arrows e and f. Furthermore the coupling bars 47c and 48c have vertically elongated holes 50 in the end portions. The holes 50 are engaged with engaging pins 51 which are extended from the base end portions of the arms 47a and 48a, respectively. Cam pins 52a and 52b are embedded in the upper surfaces of the rear end portions of the coupling bars 47c and 48c. The cam pins 52a and 52b are engaged With a loading cam groove 53 which is formed in the lower surface of the cam 11. A spring 54 urging the coupling bar 48c backwardly, and a disk detector 55 made up of a limit switch or the like are connected to the coupling bar 48c of the side loading section 48; while a spring 56 urging the coupling bar 47c forwardly, and a protruded piece 57 which is confronted with detecting units 55a and 55b of the disk detractor 55 are connected to the coupling bar 47c of the lower loading section 47.

Before a disk D is held by the loading mechanism 8, as shown in FIGS. 9 and 10 the disk clamping pieces 47b and 48b are spaced away from the disk D. Hence, when the carriage 7 is moved in the directions of the arrows a and b, the disk clamping pieces 47b and 48b will never collide with the disks D.

Figure 11:
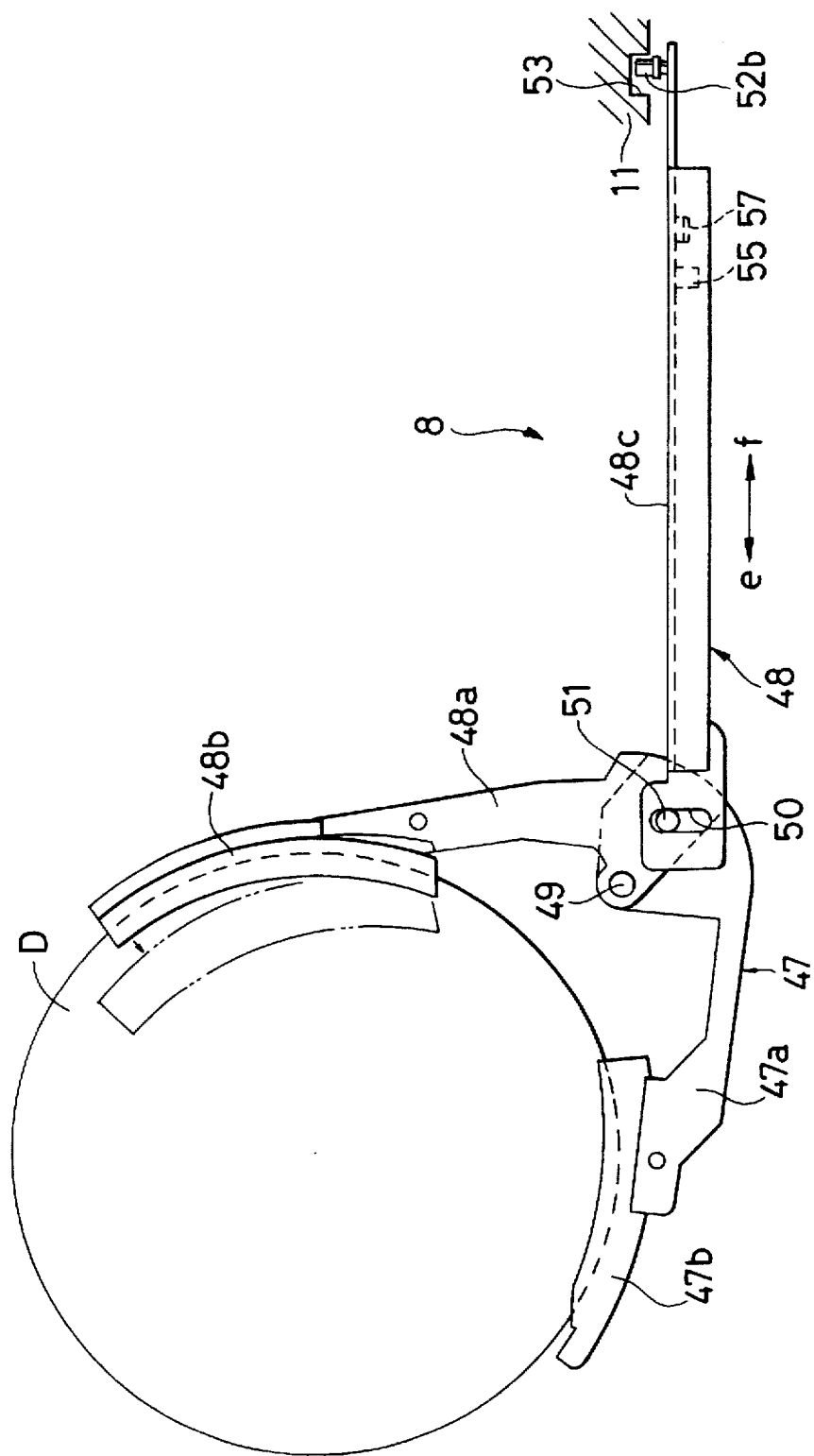
FIG. 11 is a side view showing the loading mechanism which has held a disk.
Figure 12:
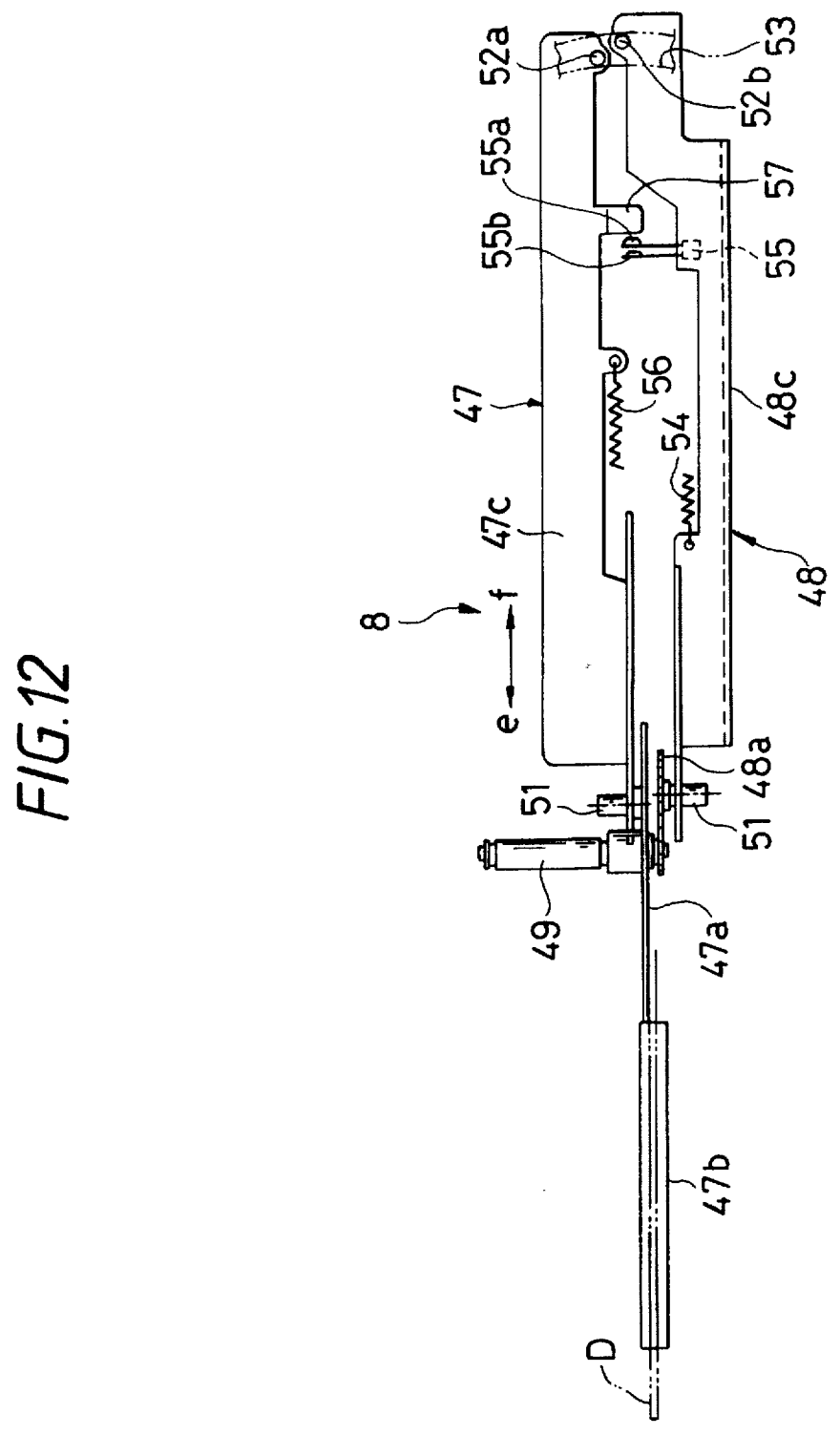

Next, when the carriage 7 is stopped at the specified disk D, and the cam 11 is turned in the forward direction (of the arrow c), as shown in FIGS. 1 (c) and 19 the disk clamping arms 47a and 48a are hell spaced away from the disk D (as shown in FIGS. 9 and 10) until the cam 11 is turned to the position C (95°) from the zero position (0°), and, while the cam 11 turns to the position E (115°) from the position D (105°), the cam pins 52a and 52b are pressed by the cam groove 53. As a result, as indicated by the solid lines in FIG. 11 and shown in FIG. 12, the coupling bar 47c of the lower loading section 47 is moved forwardly (in the direction of the arrow e), while the coupling bar 48c of the side loading section 48 is moved backwardly (in the direction of the arrow f), so that the disk D is held by the disk clamping arms 47a and 48a.

Figure 13:
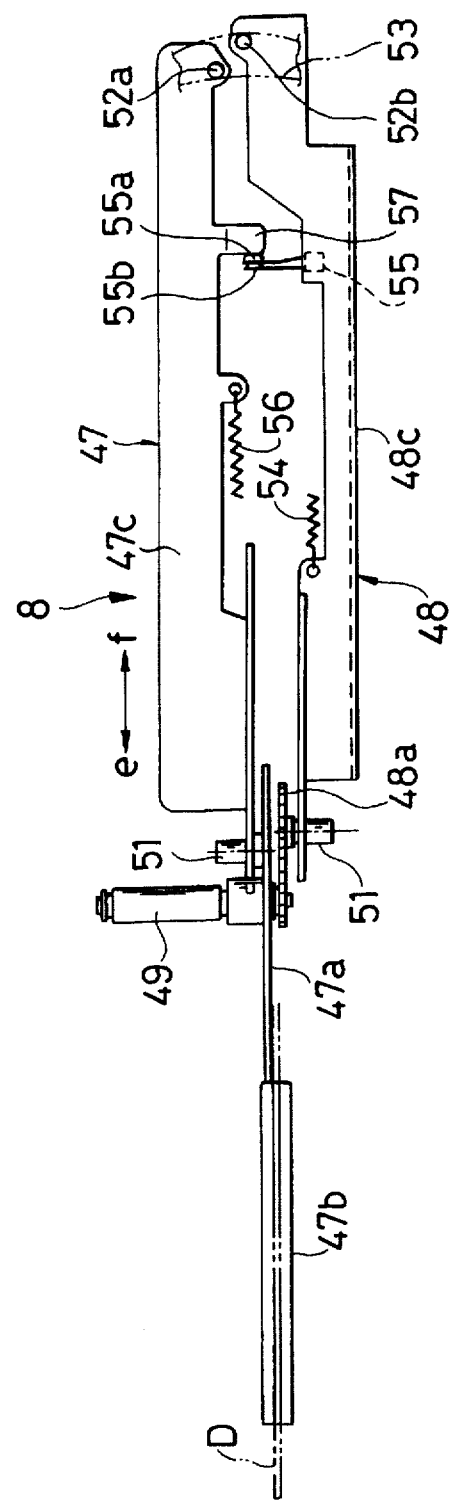
FIG. 13 is a plan view showing a state of the loading mechanism in the case where a specified disk is not present in a group of disks.

A recess 53a is formed in the outer wall of the cam groove 53 in such a manner that it extends from the position E to the position F (250°). Hence, in the case where the disk D is held by the disk clamping arms 47a and 48a, the cam pin 52b is moved along the phantom line 59 irrespective of the recess 53a. On the other hand, in the case where the specified disk D it not present; that is, in the case where it is impossible for the disk clamping arms 47a and 48a to hold the disk, as indicated by the phantom lines in FIG. 11, the disk clamping arm 48a of the side loading section 48 is swung forwardly, and accordingly the coupling bar 48c is moved backwardly (in the direction of the arrow f), and the cam pin 52b is moved along the recess 53a. Hence, as shown in FIG. 13, the detecting units 55a and 55b of the disk detector 55 abut against the protruded piece 57, so that the disk detector 55 is activated to detect that the disk D is not present.

Figure 14:
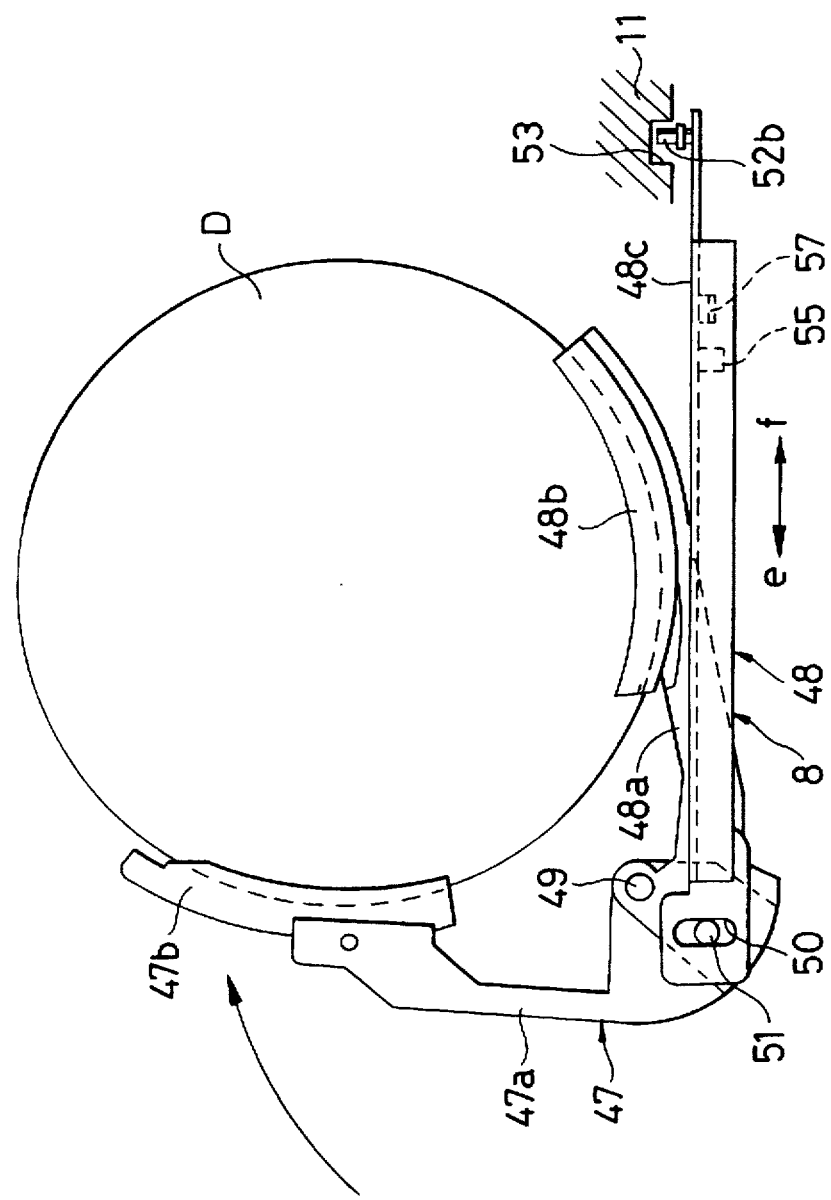
FIG. 14 is a side view showing the loading mechanism which is loading a disk.

While the cam 11 is turned to the position G (290°) by the disk D held with the disk clamping arms 47a and 48a, the two cam pins 52a and 52b are pressed by the cam groove 53, so that the two coupling bars 47c and 48c are moved forwardly (in the direction of th arrow e). Thus, the two arms 47a and 48a are backwardly swung about the pivotally supporting shaft 49, so that, as shown in FIG. 14, the disk D is placed in the disk mounting mechanism 10.

As the cam 11 is turned to the position H (320°), the cam pins 52a and 52b are pressed by the cam groove 53, so that the disk clamping arms 47a and 48a are opened and spaced away from each other, thus releasing the disk D.

Figure 15:
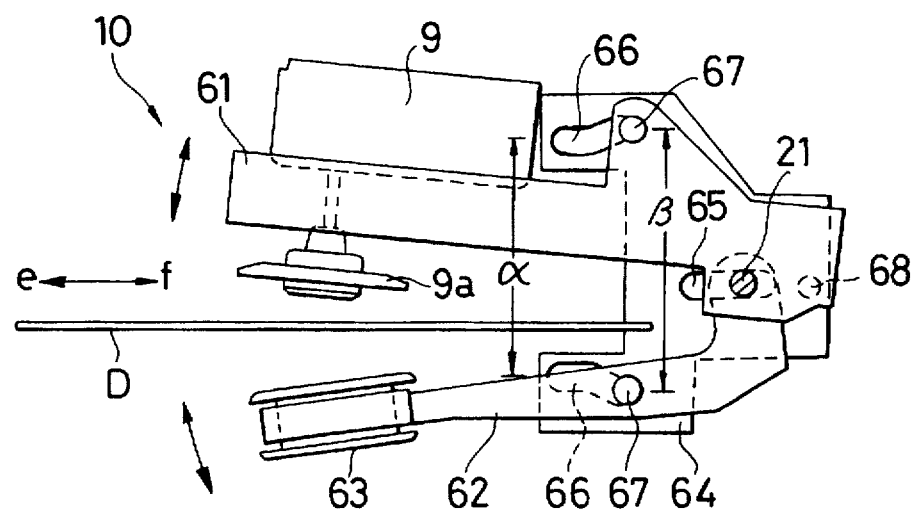
FIG. 15 is a plan view showing a disk mounting mechanism in the automatic disk changer which is going to mount a disk on the player body.
Figure 16:
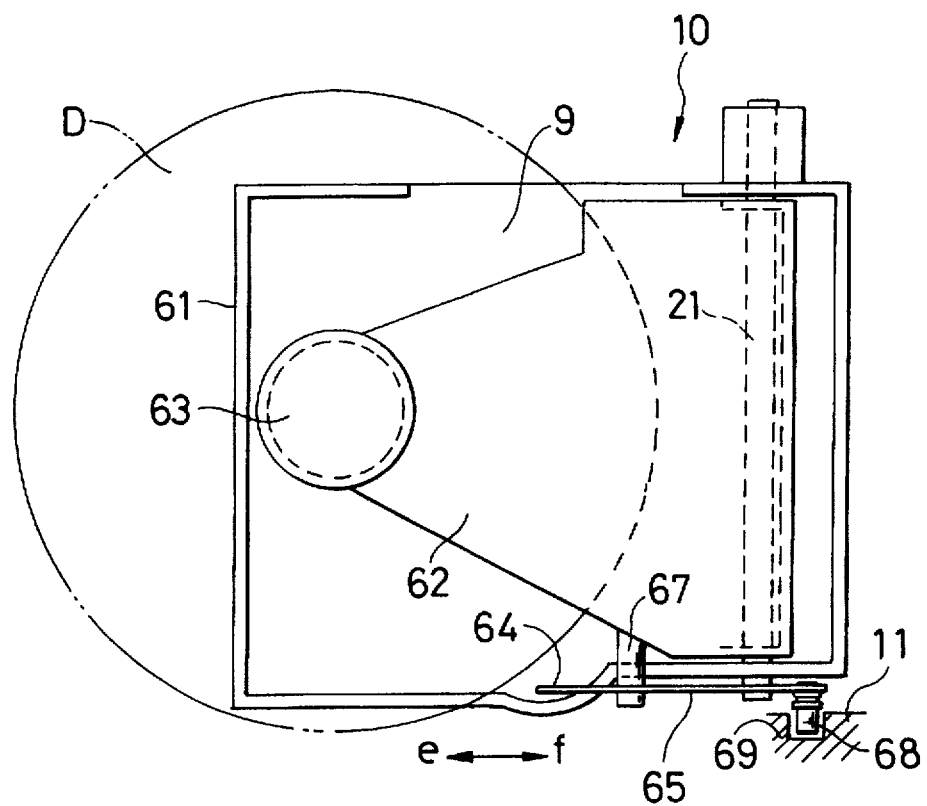
FIG. 16 is a side view of the disk mounting mechanism shown in FIG. 15.

The aforementioned disk mounting mechanism 10 is designed as shown in FIGS. 15 and 16. That is, it has a pair of swingable frames 61 and 62 which are arranged so that they can be opened and closed about the shaft 21. A player body 9 including a turn table 9a, an optical pickup, etc. is mounted on the swingable frame 61, while , disk retaining member 63 is mounted on the swingable frames 62 to detachably mount a disk on the turn table 9a. An operating board 64 is provided below the swingable frames 61 and 62 in such a manner that it is movable in the directions of the arrows e and f. The operating board 64 has an elongated hole 65 in the middle which is engaged with the supporting shaft 21. The operating board 64 is substantially in the form of a fork, having two legs. The two legs of the operating board 64 have a pair of through-holes 66, respectively which are each bent in two steps (hereinafter referred to ask "bent holes 66", when applicable). The bent holes 66 are engaged with engaging pins 67 which are extended from the swingable frames 61 and 62, respectively. On the other hand, a cam pin 68 embedded in the base end portion of the operating board 64 is engaged with a cam groove 69 formed in the upper surface of the cam 11. The distance a between the front ends of the bent holes 66 is shorter than the distance β between the rear ends thereof (α<β).

Figure 17:
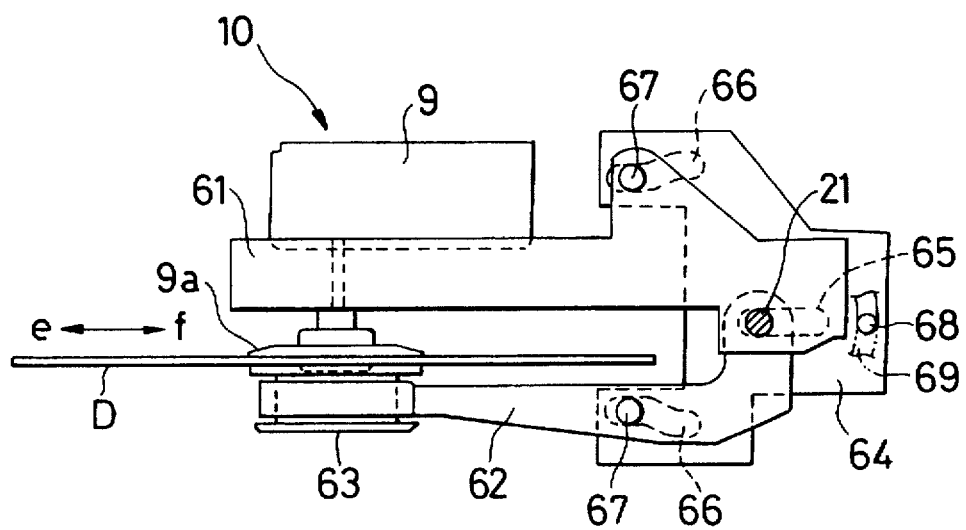
FIG. 17 is a plan view showing the disk mounting mechanism which is mounting a disk on the player body.

Before the disk mounting Mechanism 10 thus constructed is operated, the swingable frames 61 and 62 are closed (as shown in FIG. 2). Under this condition, the cam 11 is turned forwardly (in the direction of the arrow c). When the cam 11 is turned to the position I (55°) from the zero position (0°), the cam pin 68 is moved forwardly (in the direction of the arrow e) by means of the cam groove 69, so that the rear ends of the bent holes 66 are engaged with the engaging pins 67, whereby the swingable frames 61 and 62 are opened, being swung about the supporting shaft 21. This condition of the swingable frames is maintained unchanged until the cam 11 is turned from the position J (85°) to the position K (260°) (cf. FIGS. 18 (a) and 19). During this period, as shown in FIG. 15, the disk D is placed between the swingable frames 61 and 62 by the loading mechanism 8. Next, while the cam 11 is turned to the position L (285°), the cam pin 68 is moved backwardly (in the direction of the arrow f) by the cam groove 69, so that the front ends of the bent holes 66 are engaged with the engaging pins 67, whereby the swingable frames 61, and 62 are closed being swung about the supporting shaft 21. As a result, as shown in FIG. 17, the disk D is held by the turn table 9a and the disk retaining member 63 and is pressed from both sides, so as to be mounted on the player body 9.

The aforementioned cam stop switch 13, as shown in FIG. 1, is made up of a tumbler switch, and its detecting lever 13a is engaged with an engaging section 71 of the cam 11 (cf. FIG. 18 (a)) which has two engaging edges 71a and 71b.

Let us consider the case where the cam 11 is turned forwardly (in the direction of that arrow c). At the time instant that the cam 11 is turned to the position M (335°) from the zero position (0°), the detecting lever 13a is engaged with the one engaging edges 71a of the engaging section 71, so that the cam stop switch 13 is activated to output a detection signal. In response to the detection signal, the rotation of the cam it is suspended. On the other hand, at the time instant that the cam 11 reaches the position N (25°) upon being turned from the position M in the opposite direction (in the direction of the arrow d), the detecting lever 13a is engaged with the other engaging edge 71b of the engaging section 71 of the cam, so that the cam stop switch 13 is activated to output a detection signal. In response to the detection signal, the rotation of the cam 11 is suspended.

In the automatic disk changer thus organized, the loading mechanism 8, the disk mounting mechanism 10, the locking pin 12, and the cam stop switch 13 are operated with only one cam 11. That is, the automatic disk changer is simplified in structure and reduced in manufacturing cost as much.

Figure 20:
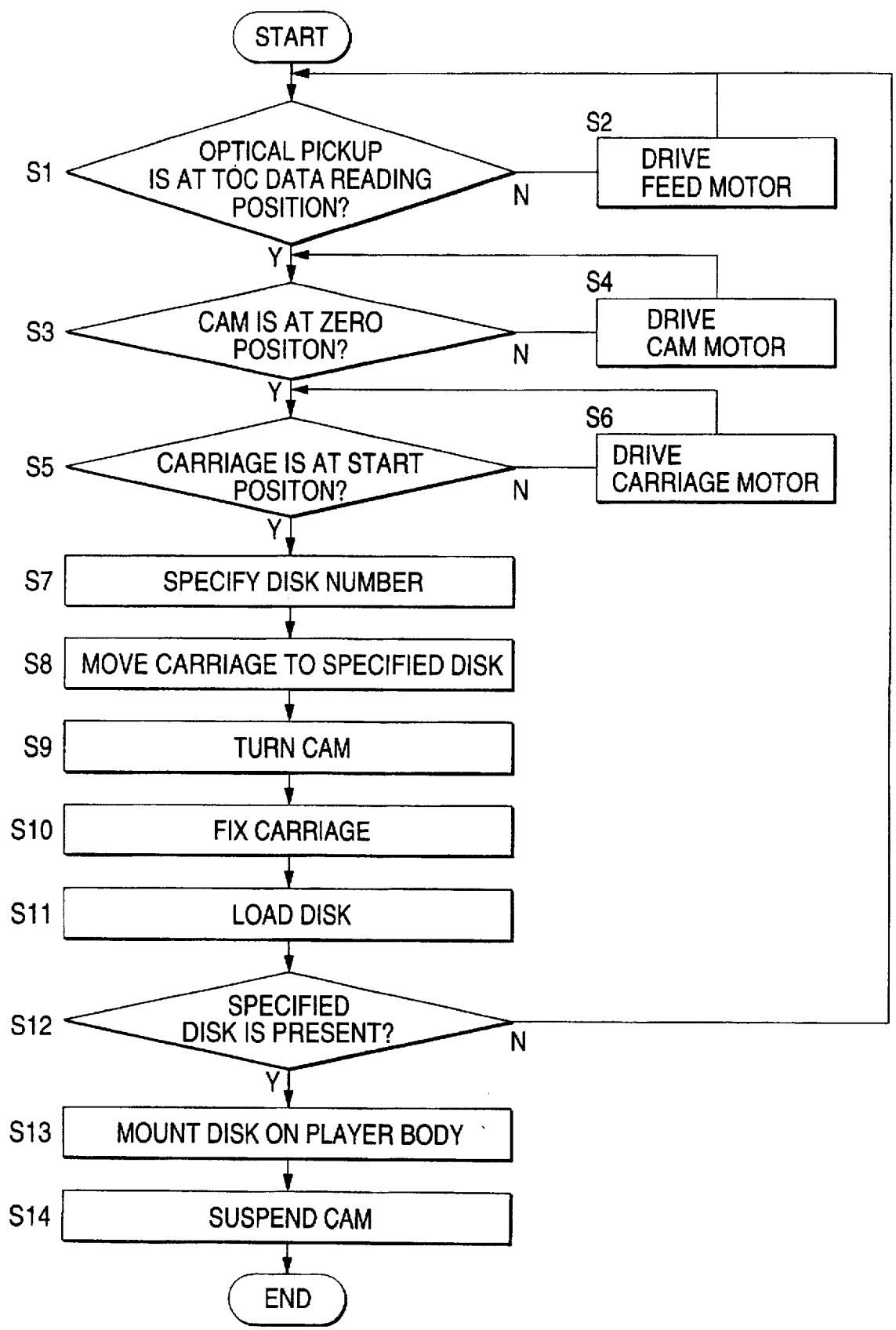
FIG. 20 is a flow chart for a description of the operation of the automatic disk changer.

The above-described loading mechanism 8, disk mounting mechanism 10, locking pin 12 and the like are controlled by a control unit (not shown) which is, for instance, made up of a microcomputer. The function of the control unit is as shown in a flow chart of FIG. 20.

That is, when the power stitch 5a is turned on, the player body 9 is operated, and it is determined whether or not the optical pickup of the player body 9 is at the TOC data reading position of the disk D (Step S1). In the case where the pickup is not at the TOC data reading position, the feed motor of the player body 9 is driven until the optical pickup reaches the TOC data reading position (Step S2). Next, it is determined whether or not the cam 11 is at the zero position (0°) (Step S3). When it is not at the zero position, the cam motor 30 is driven until the cam 11 is at the zero position (Step S4). Thereafter, it is determined whether or not the carriage 7 is at the start position (Step S5). If not, the carriage motor 27 is driven until the carriage 7 comes to the start position (Step S6). Thereafter, among a number of disks D on the disk arranging stand 6, a desired one is determined, and according to the determination the disk specifying switch 5b is operated to output a specifying signal to specify the disk number thereof (Step S7). In response to the specifying signal, the control unit operates to drive the carriage motor 27 to move the carriage 7 to the desired disk D (Step S8). As a result, as shown in FIGS. 9 and 10, the disk clamping arms 47a and 48a of the loading mechanism 8 are confront the specified disk D.

Figure 19:
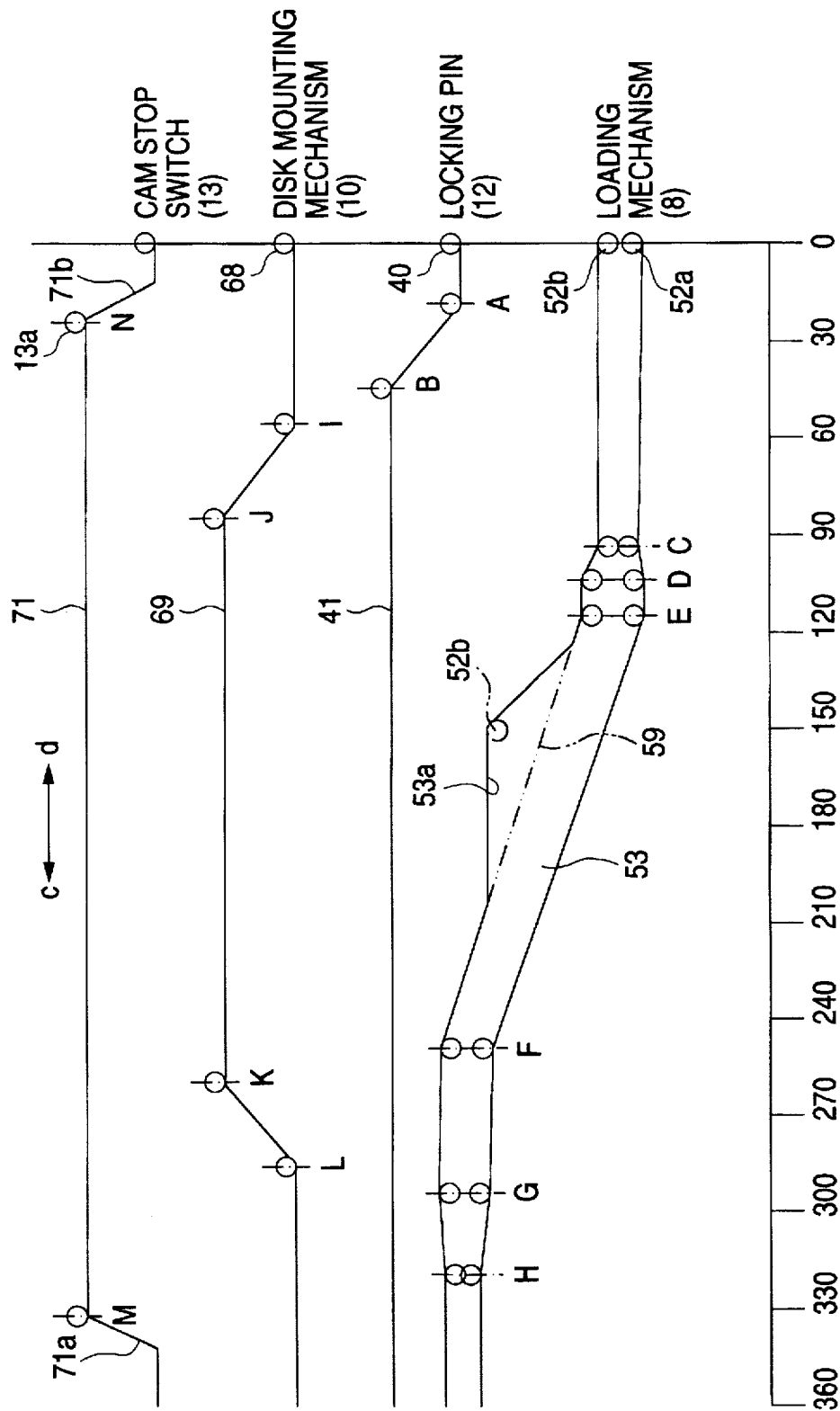
FIG. 19 is a timing chart for a description of the operation of the automatic disk changer.

Under this condition, the cam 11 is turned forwardly (in the direction of the arrow c (Step S9)), so that the locking pin 12, the disk mounting mechanism 10, the loading mechanism 8, and the cam stop switch 13 are sequentially operated according to the timing chart of FIG. 19. This will be described in more detail.

First, with the aid of the cam pin 40 and the cam groove 41, the locking pin 12 is moved forwardly (in the direction of the arrow e), thus being inserted into the locking hole 43 (cf. FIGS. 7 and 8). Thus, the carriage 7 is fixedly positioned (Step S10).

Next, the disk D is loaded (Step S11). That is, after the swingable frames 61 and 62 are opened with the aid of the cam pin 68 and the cam groove 69 of the disk mounting mechanism 10 (as shown in FIG. 15), with the aid of the cam pins 52a and 52b and the cam groove 53 of the loading mechanism 8 the coupling bar 47c of the lower loading section 47 is moved forwardly (in the direction of the arrow e) while the coupling bar 48c of the side loading section 48 is moved backwardly (in the direction of thug arrow f), so that the disk is held by the disk clamping arms 47a and 48a (as indicated by the solid lines in FIG. 11 and shown in FIG. 12). Thereafter, the coupling bars 47c and 48c are moved forwardly (in the direction of the arrow e), so that the disk D held with the disk clamping arms 47a and 48a is placed on the carriage 7 (cf. FIG. 14) and inserted into the space between the swingable frames 61 and 62 of the disk mounting mechanism 10 (cf. FIG. 15).

During the aforementioned disk loading operation, it is determined whether or not the specified disk D is present in the group of disks (Step S12). In the case where the specified disk D is not present therein, and it is therefore impossible for the disk clamping arms 47a and 48a to hold it, as indicated by the phantom lines in FIG. 11 the disk clamping arm 48a of the side loading section 48 is swung forwardly, while in association with the forward swing of the arm 48a the coupling bar 48c is moved backwardly (in the direction of the arrow f), so that the detecting units 55a and 55b of the disk detector 55 abut against the protruding piece 57; that is, the disk detector 55 is activated to output the detection signal. In response to the detection signal, the above-described operations are terminated, so that the carriage 7 is returned to its standby position.

When, as was described before, the disk D is inserted into the space between the swingable frames 61 and 62 of the disk mounting mechanism 10 (cf. FIG. 15), the swingable arms 61 and 62 are closed, so that the disk D is clamped by the disk retaining member 63 and the turn table 9a, thus being mounted on the player body 9 (Step S13). Thereafter, the detecting lever 13a of the cam stop switch 13 is engaged with the one engaging edge 71a of the engaging section 71, so that the cam stop switch 13 is activated to output the detection signal. In response to the detection signal, the rotation of the cam 11 is suspended (Step S14).

Under this condition, the player body 9 is operated to reproduce data from the disk D. After the reproduction of data, the above-described operations are carried out in the reverse order, so that the disk D is returned to its original position on the disk arranging stand 6, and the carriage 7 is returned to the standby position.

The automatic disk changer thus organized has the following effects or merits: As the lid is opened, it is moved to be positioned behind a number of disks arranged on the disk arranging stand, thus preventing the disks from dropping backwardly from the disk arranging stand. That is, the lid serves as a mechanism for preventing disks from dropping from the disk arranging stand. Hence, the automatic disk changer of the invention is simple in structure and low in manufacturing cost when compared with the conventional one.

What is claimed is:

1. An automatic disk changer comprising:

a housing having an opening in a front wall thereof through which a disk is put in or taken out of said housing;

a disk arranging stand on which a number of disks put in said housing through said opening are arranged at predetermined intervals;

a carriage which is movable along said disk arranging stand in a carriage movement area;

a loading mechanism, provided on said carriage, for taking a desired disk out of the disks arranged on said disk arranging stand and placing said disk on said carriage;

a disk mounting mechanism, provided on said carriage, for mounting on a player body said disk thus placed on said carriage; and a lid for opening and closing said opening of said housing in such a manner that said lid, when opened, is positioned between the disks arranged on said disk arranging stand and the carriage movement area to prevent a disk from unintentionally dropping from the disk arranging stand into the carriage movement area during placement of disks on said disk arranging stand and which, when closed, is no longer positioned between the disks arranged on said disk arranging stand and the carriage movement area so as to permit said loading mechanism to take a desired disk out of the disks arranged on said disk arranging stand and place the disk on said carriage.

2. The automatic disk changer as claimed in claim 1, wherein said lid includes a front plate substantially L-shaped in section, a top plate extended from an upper edge of said front plate, and right and left side plates which are extended from right and left edges of said front plate and said top plate, respectively.

3. The automatic disk changer as claimed in claim 2, wherein a pivotally supporting protrusion is formed on each of outer surfaces of said sidle plates, and a pivotally supporting recess is formed in each of inner surfaces of side plates of said housing which are confronted with said side plates of said lid, said pivotally supporting protrusion being engaged with said pivotally supporting recess so that said lid is swingable about an axes of said pivotally supporting protrusion and said pivotally supporting recess.

4. The automatic disk changer as claimed in claim 3, wherein a pair of engaging grooves are formed in said pivotally supporting recess in such a manner that they form a predetermined angle, and in correspondence to said engaging grooves, an engaging protrusion is formed on said pivotally supporting protrusion, said engaging protrusion being engaged with one of said engaging grooves; when said lid is closed and said engaging protrusion being engaged with the other of said engaging grooves when said lid is opened.

5. The automatic disk changer as claimed in claim 3, wherein an axis of rotation of said lid is shifted upwardly from an axis of the disks arranged on said disk arranging stand.

* * * * *